Figure 1:
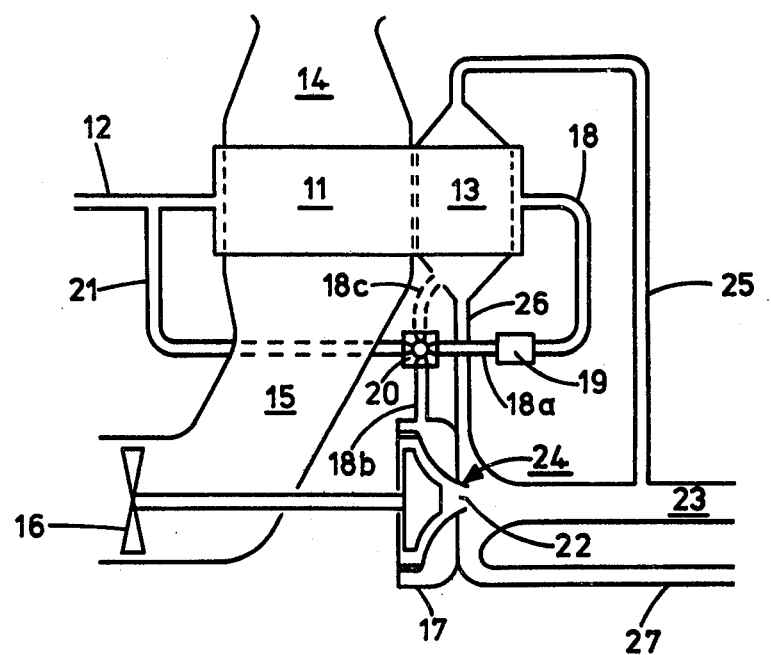

United States Patent [19]

Giles et al.

[11] 4,127,011
[45] Nov. 28, 1978

[54] AIR CYCLE AIR CONDITIONING SYSTEMS

[75] Inventors: George R. Giles, Crewkerne; Donald Richards, Yeovil, both of England

[73] Assignee: Normalair-Garret (Holdings) Limited, Yeovil, United Kingdom

[21] Appl. No.: 796,651

[22] Filed: May 13, 1977

[30] Foreign Application Priority Data

May 18, 1976 [GB] United Kingdom ............ 20483/76

[51] Int. Cl.² .......................................... F25D 9/00
[52] U.S. Cl. ............................................... 62/402
[58] Field of Search ......................................... 62/402

[56] References Cited

U.S. PATENT DOCUMENTS

| | | | |
|---|---|---|---|
| 2,485,590 | 10/1949 | Green | 62/402 |
| 2,557,099 | 6/1951 | Green | 62/402 |
| 2,614,815 | 10/1952 | Marchant et al. | 62/402 |
| 2,800,002 | 7/1957 | Seed | 62/402 |
| 2,992,542 | 7/1961 | Arthur | 62/402 |
| 3,699,777 | 10/1972 | Rannenberg | 62/402 |
| 4,018,060 | 4/1977 | Kinsell | 62/402 |

*Primary Examiner*—Lloyd L. King
*Attorney, Agent, or Firm*—Larson, Taylor and Hinds

[57] ABSTRACT

An air cycle air conditioning system has an air expansion turbine arranged to deliver air through an outlet formed by a wall having an outer surface that defines in part passage means through which supply air flows to the turbine. Heat flow from the supply air into the wall prevents formation of ice in the outlet so that in at least one phase of system operation the turbine delivers air at sub-zero temperature with which large quantities of augmenting air can be mixed so as to increase the system cooling capacity.

21 Claims, 11 Drawing Figures

AIR CYCLE AIR CONDITIONING SYSTEMS

This invention relates to air cycle air conditioning systems, and is particularly concerned with an air cycle air conditioning system having an expansion turbine that in operation supplies air at sub-zero temperature.

There is a continuing requirement for air conditioning systems to provide increased cooling capacity. It is well understood that by reducing the temperature of the air delivered from an air expansion turbine larger proportions of augmenting air can be added thereto in order to obtain an air flow at a suitable temperature for supply to an enclosure. However, to date, it has not been possible to utilize sub-zero temperatures because chilling of the turbine structure in the region where expansion occurs, and chilling of the turbine outlet, results in ice formation as condensation appears. This icing impairs the performance of the turbine and consequently that of the system, and effectively prevents the addition of larger proportions of augmenting air to provide increased cooling capacity.

It is an object of the present invention to provide an air cycle air conditioning system having an air expansion turbine that, in operation of the system, supplies air at sub-zero temperature without the formation of ice.

According to the invention an air cycle air conditioning system includes an air expansion turbine having a turbine inlet, turbine nozzles, and a turbine wheel, arranged to deliver air at sub-zero temperature through an outlet formed by a wall having an outer surface that defines in part passage means through which, in operation of the system, supply air flows from a system inlet to the turbine inlet, so that there is a heat flow from the supply air into the wall to maintain the outlet at a temperature above which ice can adhere.

In one form of the invention a duct connects the system inlet to the turbine inlet by way of heat exchange means and the passage means in downstream order.

In this form of the invention the system may include a multi-way valve conjoined in line with the duct between the heat exchange means and the turbine inlet, so that, in operation of the system, all of the air passing from the heat exchange means to the turbine inlet passes through the multi-way valve. A by-pass duct may be provided to connect the system inlet with the multi-way valve.

In another form of the invention a duct connects the system inlet to the turbine inlet by way of the passage means and heat exchange means in downstream order.

In this form of the invention the system may include a multi-way valve having a first connection conjoined with the system between the heat exchange means and the turbine inlet, a second connection conjoined with the system between the system inlet and the passage means, and a third connection conjoined into the outlet from the turbine.

The outlet from the turbine may be conjoined with a system outlet supply duct in a manner forming a jet pump arrangement, and an induction duct for conveying augmenting air may be connected into the system outlet supply duct coincident with the jet pump arrangement.

Figure 2:
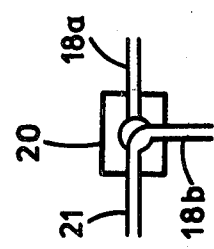
Figure 2A:
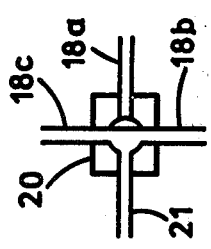
Figure 2B:
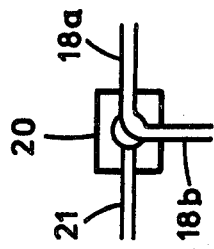
Figure 2C:
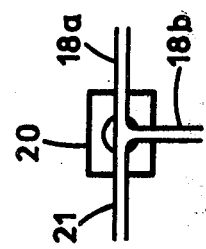
Figure 3:
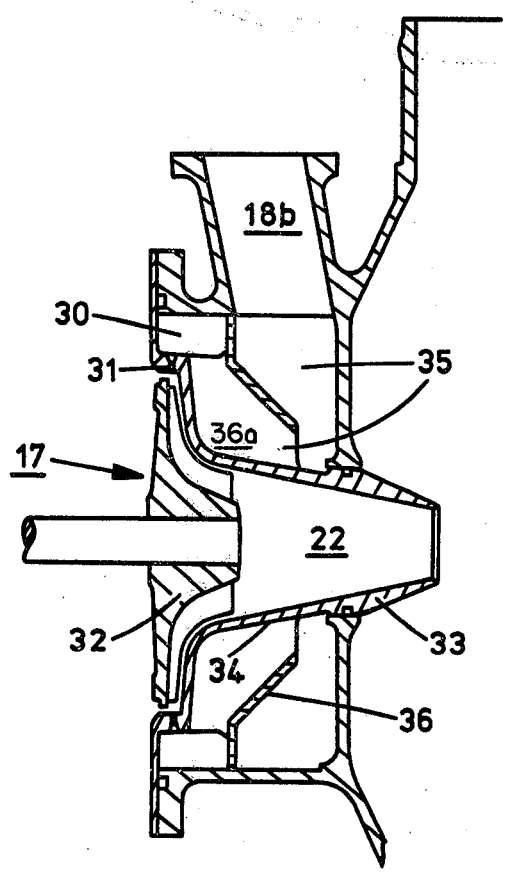
Figure 4:
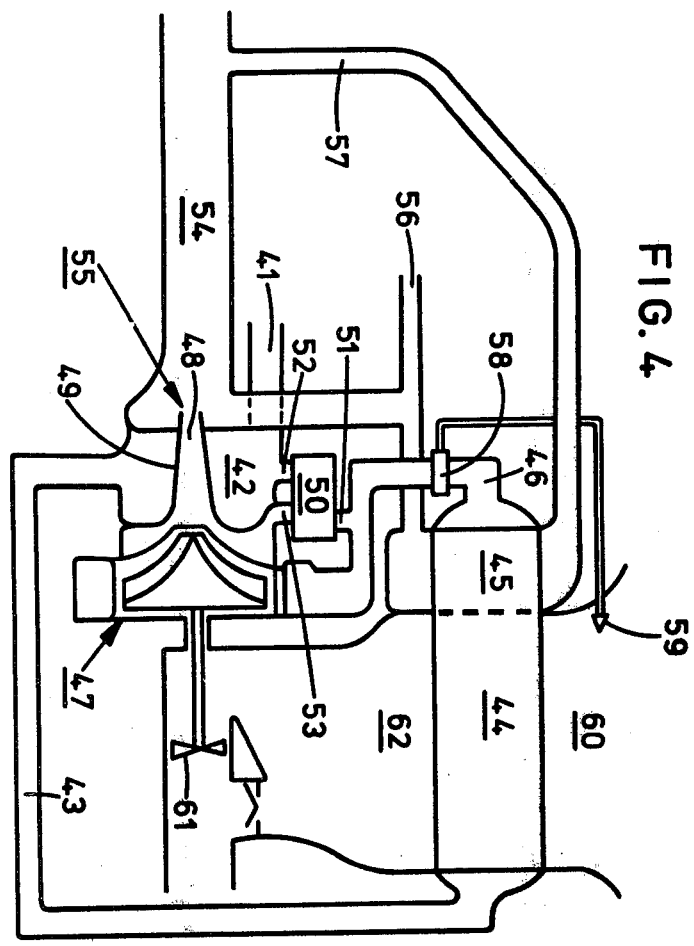

Two embodiments of the invention will now be described, by way of example only, with reference to the accompanying drawings, in which:

FIG. 1 is a schematic diagram of an air cycle air conditioning system in accordance with one embodiment of the present invention, FIGS. 2, 2a, 2b and 2c are schematic illustrations of various flow paths through a multi-way valve incorporated in the system shown in FIG. 1, FIG. 3 is a cross-section through a turbine suitable for use in the system shown in FIG. 1, FIG. 4 is a schematic diagram of an air cycle air conditioning system in accordance with another embodiment of the invention, and FIGS. 5, 5a, 5b and 5c are schematic illustrations of various flow paths through a multi-way valve incorporated in the system shown in FIG. 4.

An air cycle air conditioning system suited to aircraft use is shown in FIG. 1. The system includes a primary heat exchanger 11 having a first passage connected on the upstream side to a system inlet duct 12 and being directly connected on the downstream side to the first passage of a regenerative heat exchanger 13. A ram air inlet duct 14 connects with one side of a second passage of the primary heat exchanger 11 and an outlet duct 15 connects with the other side of the second passage. The outlet duct 15 houses a fan 16 driven by an air expansion turbine 17. The outlet of the first passage of the regenerative heat exchanger 13 is connected with the inlet of the turbine 17 by way of a duct 18, 18a, 18b, that is interposed in downstream order by a water extractor 19 and a multi-way valve 20. An outlet 22 from the turbine 17 is conjoined with a system outlet supply duct 23 in a manner forming a jet pump arrangement 24. A by-pass duct 21 extending from the system inlet duct 12 also connects with the multi-way valve 20.

The upstream side of the second passage of the regenerative heat exchanger 13 is conjoined with the system outlet supply duct 23 by way of a duct 25. The downstream side of the second passage of the heat exchanger 13 is connected by way of a duct 26 into the system outlet supply duct 23 coincident with the jet pump arangement 24. The ducts 25, 26, together with the second passage of the heat exchanger 13 are designated herein as a regenerative loop. Also conjoined with the jet pump arrangement 24 is a recirculation duct 27 arranged for connection to the cabin of the aircraft (not shown) as is the system outlet supply duct 23.

An optional duct 18c, illustrated in broken line in FIG. 1, may connect the multi-way valve 20 with the duct 26 leading from the second passage of the regenerative heat exchanger 13, in order that unusually high temperature requirements can be provided where necessary.

An air expansion turbine 17, suitable for use in the system shown in FIG. 1, is illustrated in cross-section in FIG. 3, and comprises a turbine inlet 30, turbine nozzles 31 and a turbine wheel 32. An outlet 22 from the turbine 17 is formed by a wall 33 having an outer surface 34 that defines in part passage means 35 leading from the duct 18b to the turbine inlet 30. The passage means 35 is further defined by an annular baffle wall 36 that is supported by webs or fins 36a from and, preferably, integral with the outlet wall 33.

In operation of the system shown in FIG. 1, assuming that a maximum cold condition is required, suitably filtered air is supplied from an engine of the aircraft (not shown) to the system inlet duct 12, and passes by way of the first passages of both the primary and regenerative heat exchangers 11, 13, respectively, the duct 18, water extractor 19, duct 18a, multi-way valve 20, and duct 18b to the air expansion turbine 17. The turbine 17 delivers air at sub-zero temperature through the outlet 22 and the jet pump arrangement 24 into the system outlet supply duct 23 to pass to the aircraft cabin (not shown). The second passage of the primary heat exchanger 11 passes ram air overboard, providing initial cooling of the supply air aand, by way of the turbine driven fan 16, absorbing energy of the turbine 17 in the form of heat as the fan works on the ram air to assist in its discharge overboard. Further cooling of the supplied air occurs in the regenerative heat exchanger 13 where heat is transferred to air that is drawn through duct 25 from the system outlet supply duct 23 and returned thereto through duct 26, being induced to trasverse around the regenerative loop by the action of the jet pump arrangement 24. Further cooling of the supplied air takes place in the turbine 17 as it expands in crossing the turbine wheel 32 between the nozzles 31 and the wall 33 of the outlet 22, where a sub-zero air temperature obtains. Recirculation air from the cabin is induced by the jet pump arrangement 24 to conjoin with the cold air discharged from the turbine 17 and raise its temperature before it is delivered through duct 23. Initial cooling in the primary heat exchanger 11 is improved by injecting into the inlet duct 14 water in atomised form from the water extractor 19.

The occurrence of ice forming in the region of the outlet 22 from the turbine 17 is prevented by the constructional arrangement of the passage means 35 leading from the duct 18b to the turbine inlet 30, as shown in FIG. 3. Supply air fed to the turbine nozzles 31 flows over the surfaces of the passage means 35 at high velocity and consequently with raised heat transfer coefficiency. Of these surfaces the wall 33 acts as the primary heat transfer surface while the annular baffle wall 36 and the webs 36a act as secondary heat transfer surfaces. Thus, during operation supply air provides a continuous heat flow from itself into the wall 33 whereby the outlet 22 is maintained at a temperature above which ice can adhere, although the air being delivered through the outlet 22 is at sub-zero temperature.

The obturating position of the multi-way valve 20 governs the temperature of the conditioned air delivered by the system and for the "full cold" condition, as hereinbefore described, the obturating position is as shown in FIG. 2. In the "full hot" condition both the primary and regenerative heat exchangers, 11, 13, respectively, are completely by-passed so that air from the system inlet duct 12 is conveyed direct to the turbine 17 by way of the by-pass duct 21 and duct 18b, being so directed by operation of the multi-way valve 20 to the position shown in FIG. 2a. Temperature of the delivered air intermediate "full cold" and "full hot" is obtained by operation of the multi-way valve 20 to some suitable position which proportions opening of both the duct 18a and the by-pass duct 21 to duct 18b, as shown in FIG. 2b.

In some operational climatic conditions it may be that sufficient heat is not obtainable from a system circuit having a three-way valve 20, and that a four-way valve is necessary so that, after by-passing the heat exchangers 11 and 13 some of the supplied air also by-passes the turbine 17. This system employs the optional duct 18c, shown in broken line in FIG. 1, and in order to obtain the "full hot" condition the four-way valve 20 is set to a position as shown in FIG. 2c. In this position the duct 18a is closed and air is supplied direct from the inlet supply duct 12 through by-pass duct 21 to the multi-way valve 20 where it is split so that a portion of the air flows through the duct 18b to the turbine 17, and a portion of the air flows by way of the duct 18c and the duct 26 into the system outlet supply duct 23.

In another embodiment of the invention, shown in FIG. 4, an air cycle air conditioning system is supplied with bleed air from a gas turbine engine (not shown) through a system inlet duct 41. The air flows from the inlet duct 41 by way of passage means 42, a duct 43, the first passages of primary and regenerative heat exchangers 44 and 45, respectively, and a duct 46 to an air expansion turbine 47. The turbine 47 delivers air at sub-zero temperature through an outlet 48 formed by a wall 49 having an outer surface that defines in part the passage means 42 through which supply air flows to the turbine. Thus at all times during operation of the system there is a heat flow into the wall 49 from air flowing through the passage means 42 that maintains the outlet 48 at a temperature above which ice can adhere.

Figures 5, 5A:
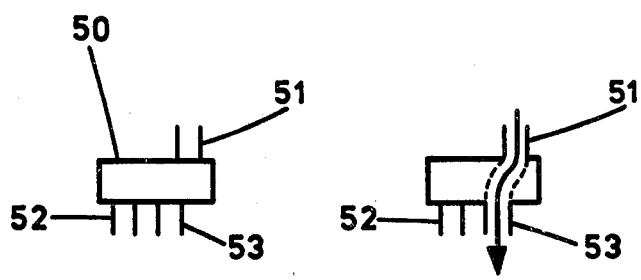
Figures 5B, 5C:
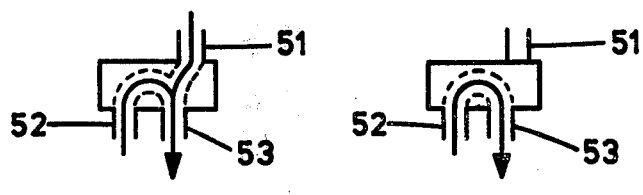

A multi-way valve 50 is included in the system, and has a first connection 51 conjoined with the duct 46 that leads from the first passage of the regenerative heat exchanger 45 to the turbine 47, a second connection 52 conjoined with the system intermediate the inlet duct 41 and the passage means 42, and a third connection 53 conjoined into the outlet 48 from the turbine 47. The obturating position of the multi-way valve 50 controls the temperature of the air being supplied through the outlet 48 to the system outlet supply duct 54 leading to the cabin of the aircraft (not shown). Thus in the cold air supply condition the multi-way valve is closed, as shown in FIG. 5, and all supply air flows by way of passage means 42, duct 43, primary and regenerative heat exchangers 44 and 45, respectively, and duct 46 to the turbine 47. For the cool air supply condition the multi-way valve provides a passage between the connection 51 from the duct 46 and the connection 53 to the outlet 48. This allows some of the air that has been pre-cooled by the primary and regenerative heat exchangers to by-pass the turbine 47 by flowing through the multi-way valve direction to the outlet 48. For the warm air supply condition the multi-way valve 50 provides connecting passages between the connection 51 and the connection 53, and also between the connection 52 and the connection 53, as shown in FIG. 5b. This again allows some of the air that has been pre-cooled by the primary and regenerative heat exchangers to by-pass the turbine 47 and flow through the multi-way valve direct to the outlet 48, while at the same time a portion of the bleed air is able to flow through the passage in the multi-way valve interconnecting the connection 52 with the connection 53, direct to the outlet 48, thus by-passing both the primary and regenerative heat exchangers and the turbine. For the hot supply condition the multi-way valve provides a passageway between the connection 52 and the connection 53, as shown in FIG. 5c. This allows a portion of the bleed air to by-pass the primary and regenerative heat exchangers 44 and 45, respectively, and the turbine 47, and flow direct to the outlet 48 to raise the temperature of the air being delivered by the turbine.

The outlet 48 is conjoined with the system outlet supply duct 54 in a manner forming a jet pump arrangement 55, whilst a recirculation duct 56 from the aircraft cabin is conjoined with the outlet supply duct 54 coincident with the jet pump arrangement 55 so that the jet pump arrangement induces cabin air to be recirculated.

A duct 57 is connected to the outlet supply duct 54 downstream of the jet pump arrangement 55 and joins with the duct 56 near the turbine outlet 45 by way of the second passages of the regenerative heat exchanger 45 so as to form a regenerative loop.

A water collector 58 is connected into the duct 46 and has a connection to a water spray nozzle 59 that is positioned so as to inject water in atomized form into a ram air intake duct 60 leading to the second passage of the primary heat exchanger 44. The turbine 47 drives a fan 61 positioned in an outlet duct 62 leading from the second passage of the primary heat exchanger 44. The fan 61 assists the discharge of air from the outlet duct 62.

In both embodiments of the invention operation of the multi-way valve may be provided by any known and suitable means (not shown), however, in the case where the system is being used for aircraft cabin air conditioning the multi-way valve may be controlled by a cabin temperature controller that has further connections to a cabin temperature sensor and a cabin temperature selector.

Of course the embodiments hereinbefore described with reference to and shown in the accompanying drawings are by way of example only, modifications being possible within the scope of the invention. For instance, augmenting air may be supplied to the system from any suitable source, and may be introduced to the system downstream of the outlet from the turbine by any convenient means. The turbine may be included in a system as part of an arrangement that is known as a "boot strap" arrangement, in which the turbine drives a compressor wheel (in substitution of a fan) that compresses air passing to the turbine inlet by way of a heat exchanger. For example, in FIGS. 1 and 4 the fan 16 or 61, respectively, could be substituted by a compressor wheel effectively situated in duct 12 or 43, respectively.

We claim as our invention:

1. An air cycle air conditioning system including, in combination,
    an air system inlet for connection with a supply of pressurized air,
    an air system outlet for connection with a region to which conditioned air is to be delivered,
    an air expansion turbine connected between the system inlet and the system outlet,
    said turbine including an inlet, turbine nozzles, a turbine wheel, and a turbine outlet whereby air passing through the inlet and turbine nozzles is directed onto the turbine wheel to deliver expanded air to the turbine outlet,
    passage means connecting the system inlet and said turbine inlet,
    said passage means including a wall disposed in said turbine, said wall having an inner surface defining at least a part of said turbine outlet, said wall having an outer surface defining at least a part of the conduit connection between said system inlet and said turbine inlet,
    whereby in operation of the air conditioning system the outer surface of said wall provides for a primary heat transfer from supply air flowing from the system inlet to said turbine inlet to prevent icing on the inner surface of said wall due to passage of conditioned air through the turbine outlet.

2. An air cycle air conditioning system as claimed in claim 1, wherein the passage means includes secondary heat exchange surfaces supported on the outer surface of said wall.

3. An air cycle air conditioning system as claimed in claim 1, wherein, the system inlet is conduitly connected to the turbine inlet through a heat exchanger.

4. An air cycle air conditioning system as claimed in claim 3, wherein the system includes a multi-way valve having a connection fluidly conjoined with the system between the heat exchanger and the passage means.

5. An air cycle air conditioning system as claimed in claim 4, wherein, a by-pass duct connects the system inlet to the multi-way valve.

6. An air cycle air conditioning system as claimed in claim 1, wherein the system inlet is conduitly connected to the turbine inlet by way of, in downstream order, said passage means including said wall disposed in said turbine and a heat exchanger.

7. An air cycle air conditioning system as claimed in claim 6, wherein, the system includes a multi-way valve having a first connection fluidly conjoined with the system between the passage means and the heat exchanger, a second connection fluidly conjoined with the system between the heat exchanger and the turbine inlet and a third connection fluidly conjoined with the outlet from the turbine.

8. An air cycle air conditioning system as claimed in claim 1, wherein, the outlet from the turbine is operatively associated with a secondary outlet delivery duct of the system in a jet pump arrangement.

9. An air cycle air conditioning system as claimed in claim 1, wherein, the system includes a heat exchanger, the heat exchanger being connected within the passage means between the system inlet and the turbine inlet, variable multi-way valve disposed between the heat exchanger and the turbine inlet, the multi-way valve having a connection with the outlet of the heat exchanger, a second connection with the turbine inlet and a third connection with a by-pass duct, the by-pass duct connecting the multi-way valve to the system inlet.

10. An air cycle air conditioning system as claimed in claim 9, wherein, the outlet from the turbine is operatively associated with a secondary delivery duct of the system in a jet pump arrangement.

11. An air cycle air conditioning system as claimed in claim 10, wherein, a recirculation duct is included in the system, the recirculation duct having an inlet for connection to the region to which conditioned air is delivered, the outlet from said recirculation duct being operatively connected with the jet pump arrangement.

12. An air cycle air conditioning system as claimed in claim 10, wherein the heat exchanger comprises a first and a second heat exchanger, the second heat exchanger forming part of a regenerative loop which at one end is operatively connected with the jet pump arrangement and at the other end connected with the outlet delivery duct downstream of the jet pump arrangement.

13. An air cycle air conditioning system as claimed in claim 9, including a jet pump connected to the outlet of said turbine, said jet pump including first and second induction ducts, said first induction duct being part of an air recirculation part of the system, said second induction duct being part of a regenerative loop in the system, the regenerative loop including said heat exchanger.

14. An air cycle air conditioning system as claimed in claim 1, wherein, the system inlet is conduitly connected to the turbine inlet by way of, in downstream order, passage means including said wall disposed in said turbine and a heat exchanger, a variable multi-way valve having a fluid connection with the air system inlet, a second connection in said valve with the conduit between the heat exchanger and the turbine inlet, a third connection in said valve with the outlet from the turbine.

15. An air cycle air conditioning system as claimed in claim 14, wherein, the outlet from the turbine is operatively associated with a secondary outlet delivery duct of the system to form a jet pump arrangement.

16. An air cycle air conditioning system as claimed in claim 14, including, a jet pump connected to the outlet of said turbine, said jet pump including an induction duct, the induction duct having an inlet for connection to the region to which conditioned air is delivered, and containing air for recirculation, the outlet of said induction duct being operatively connected to the turbine outlet.

17. An air cycle air conditioning system as claimed in claim 15, wherein, the heat exchanger comprises a first and second heat exchanger, the second heat exchanger forming part of a regenerative loop which at one end is operatively connected with the jet pump arrangement and at the other end connected with the outlet delivery duct downstream of the jet pump arrangement.

18. An air cycle air conditioning system as claimed in claim 14, including a jet pump connected to the outlet of said turbine, said jet pump including turbine induction ducts, one induction duct being part of an air recirculation part of the system, a second induction duct being part of a regenerative loop in the system, the regenerative loop including a discrete part of the heat exchanger.

19. An air cycle air conditioning system including, an air inlet for said system and an air outlet for said system, an air expansion turbine in conduit connection with said system inlet and said system outlet, said turbine including a turbine inlet and turbine outlet, passage means connecting said system inlet to said turbine inlet, said passage means including a wall defining at least a part of said turbine outlet, the outer surface of said wall providing a primary heat transfer surface from the air supplied to the turbine, a heat exchanger conduitly connected in series with the passage means upstream of the turbine inlet, a multi-way valve being in fluid communication with, at least, the outlet of the heat exchanger and the passage means.

20. An air cycle air conditioning system as claimed in claim 19, wherein, the primary heat transfer surface supports secondary heat transfer surfaces within the passage means.

21. An air cycle air conditioning system as claimed in claim 20, wherein the secondary heat transfer surfaces comprise an annular baffle wall supported on webs on the primary heat transfer surface.

* * * * *